(12) United States Patent
Hiltunen et al.

(10) Patent No.: US 8,990,369 B2
(45) Date of Patent: Mar. 24, 2015

(54) COLLABORATIVE QOS FOR SERVICE ORIENTED ARCHITECTURES

(75) Inventors: Matti A. Hiltunen, Morristown, NJ (US); Richard Dale Schlichting, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1167 days.

(21) Appl. No.: 12/910,041

(22) Filed: Oct. 22, 2010

(65) Prior Publication Data

US 2012/0102170 A1 Apr. 26, 2012

(51) Int. Cl.
```
G06F 15/16      (2006.01)
G06F 9/50       (2006.01)
H04L 12/24      (2006.01)
H04L 29/08      (2006.01)
```

(52) U.S. Cl.
CPC .............. *G06F 9/5055* (2013.01); *H04L 41/50* (2013.01); *H04L 67/16* (2013.01); *H04L 67/322* (2013.01)
USPC ........................................................ 709/223

(58) Field of Classification Search
CPC ................... H04W 28/18–28/24; H04L 65/80; H04L 41/046; H04L 41/5003–41/5012; H04L 41/5019; H04L 47/748; H04L 67/16; H04L 67/322
USPC .................................................. 709/223–229
See application file for complete search history.

(56) References Cited

U.S. PATENT DOCUMENTS

| | | | |
|---|---|---|---|
| 8,255,549 B2 * | 8/2012 | Gorti et al. ..................... 709/229 |
| 2002/0152297 A1 * | 10/2002 | Lebourg et al. ............... 709/223 |
| 2005/0055442 A1 * | 3/2005 | Reeves et al. ................. 709/225 |
| 2005/0132041 A1 * | 6/2005 | Kundu .......................... 709/224 |
| 2007/0233871 A1 * | 10/2007 | Fletcher et al. ............... 709/226 |
| 2007/0250611 A1 * | 10/2007 | Bhogal et al. ................. 709/223 |
| 2008/0065402 A1 * | 3/2008 | Sanamrad ........................ 705/1 |
| 2008/0183721 A1 * | 7/2008 | Bhogal et al. ................... 707/10 |
| 2009/0204612 A1 * | 8/2009 | Keshavarz-Nia et al. ......... 707/6 |
| 2009/0287766 A1 * | 11/2009 | Chan et al. .................... 709/203 |
| 2010/0100525 A1 * | 4/2010 | Huang .......................... 707/609 |

(Continued)

OTHER PUBLICATIONS

Garcia, Diego Zuquim Guimarães, and Maria Beatriz Felgar de Toledo. "A Web service architecture providing QoS management." Web Congress, 2006. LA-Web'06. Fourth Latin American. IEEE, 2006.*

(Continued)

*Primary Examiner* — Patrice Winder
*Assistant Examiner* — Julian Chang
(74) *Attorney, Agent, or Firm* — Hartman & Citrin LLC

(57) ABSTRACT

Methods, systems, and computer-readable media for providing collaborative quality of service ("QoS") for service-oriented architectures are described. The application services in the service-oriented architecture implement a QoS application-programming interface ("API") in addition to the traditional service API. The QoS API may include a QoS reporting interface for reporting values of QoS metrics of the application service, a QoS mechanism interface that exposes details of dependability mechanisms utilized by the application service, and/or a QoS negotiation interface that allows dynamic negotiation of what QoS properties the application service provides and how the QoS properties are provided. Service consumers may utilize the QoS API of the various application services in the service-oriented architecture to collect dependability information regarding the application services and make service provider selection decisions during discovery and dynamic binding.

20 Claims, 3 Drawing Sheets

(56) References Cited

U.S. PATENT DOCUMENTS

| | | | |
|---|---|---|---|
| 2010/0115085 A1* | 5/2010 | Saffre et al. ............... | 709/224 |
| 2012/0303821 A1* | 11/2012 | Fletcher et al. ............ | 709/226 |
| 2013/0346581 A1* | 12/2013 | Harris, Robert ........... | 709/223 |

OTHER PUBLICATIONS

Paton, W., et al. "SemSorGrid4Env Architecture—Phase I" (Mar. 2010).*

Dialani, Vijay, et al. "Transparent fault tolerance for web services based architectures." Euro-Par 2002 Parallel Processing. Springer Berlin Heidelberg, 2002. 889-898.*

Liu, Yutu, Anne H. Ngu, and Liang Z. Zeng. "QoS computation and policing in dynamic web service selection." Proceedings of the 13th international World Wide Web conference on Alternate track papers & posters. ACM, 2004.*

Wang, Yao, and Julita Vassileva. "A review on trust and reputation for web service selection." Distributed Computing Systems Workshops, 2007. ICDCSW'07. 27th International Conference on. IEEE, 2007.*

Ye, Gang, et al. "A QoS-aware model for web services discovery." Education Technology and Computer Science, 2009. ETCS'09. First International Workshop on. vol. 3. IEEE, 2009.*

Di Nitto, Elisabetta, et al. "Negotiation of service level agreements: An architecture and a search-based approach." Service-Oriented Computing-ICSOC 2007. Springer Berlin Heidelberg, 2007. 295-306.*

Comuzzi, Marco, and Barbara Pernici. "An architecture for flexible Web service QoS negotiation." EDOC Enterprise Computing Conference, 2005 Ninth IEEE International. IEEE, 2005.*

Wang, Changzhou, et al. "Quality of service (QoS) contract specification, establishment, and monitoring for service level management." Enterprise Distributed Object Computing Conference Workshops, 2006. EDOCW'06. 10th IEEE International. IEEE, 2006.*

Zulkernine, Farhana, et al. "A policy-based middleware for web services SLA negotiation." Web Services, 2009. ICWS 2009. IEEE International Conference on. IEEE, 2009.*

Seo, Young-Jun, Hwa-Young Jeong, and Young-Jae Song. "A study on web services selection method based on the negotiation through quality broker: A maut-based approach." Embedded Software and Systems. Springer Berlin Heidelberg, 2005. 65-73.*

Hündling, Jens, and Mathias Weske. "Modeling Quality of Services in Service-Oriented Environments." Journal of Integrated Design & Process Science 10.4 (2006): 35-45.*

Hiltunen, Matti A., et al., "Is Collaborative QoS the Solution to the SOA Dependability Dilemma?" In Architecting Dependable Systems VII, (A. Casimiro, R. de Lemos, C. Gacek, Eds.), Lecture Notes in Computer Science vol. 6420, Springer-Verlag, Berlin, 2010.

* cited by examiner

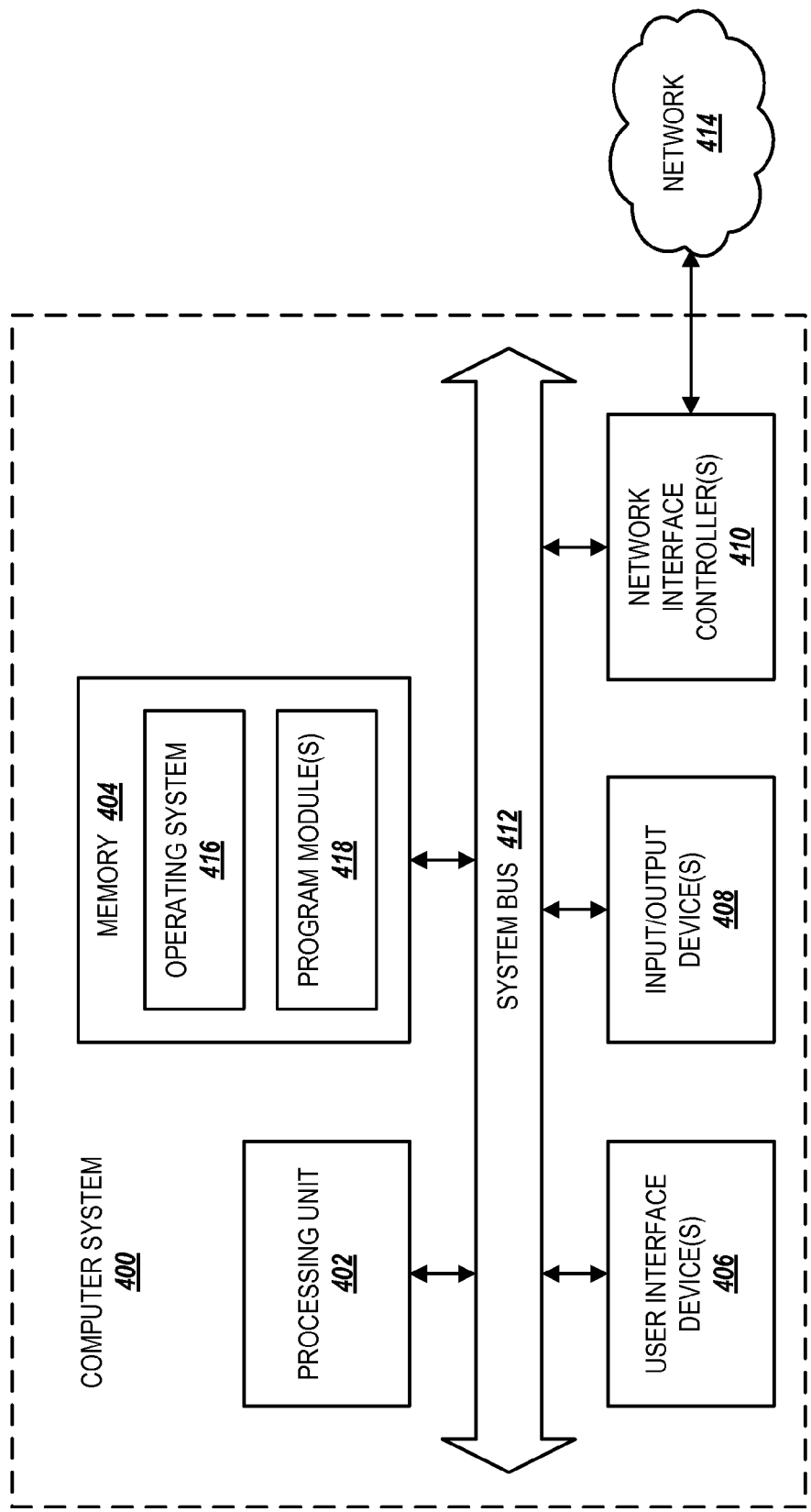

COLLABORATIVE QOS FOR SERVICE ORIENTED ARCHITECTURES

BACKGROUND

This disclosure relates generally to the field of computer systems and software architectures. More specifically, the disclosure provided herein relates to quality of service ("QoS") in service-oriented architectures.

Applications or software systems built upon a service-oriented architecture ('SOA") are generally structured as a collection of interacting and interoperable services in which functionality is exported through well-defined interfaces. Traditionally, SOAs are implemented by a single organization that owns and operates all services. In such architectures, there is typically only one instance of each service and the bindings of client applications to services (or services to services) are static. However, with the advent of cloud computing and software as a service ("SaaS"), a distributed SOA may be implemented in which the services are owned and operated by multiple service providers with multiple administrative domains, and that are potentially widely geographically distributed, even across continents.

Further, some services may have multiple implementations that are discovered using one or more discovery services. Such SOAs may have numerous users and applications utilizing the services, where the users' access patterns and frequency varies over time. Services may be provided on multiple levels, including application services implementing specific functionality, platform services providing an integrated environment in which to implement and deploy software services and applications, and infrastructure services for providing storage, processing, networking, and other hardware and technology resources upon which other services may execute. Examples of applications that may be implemented on distributed SOAs include business applications, such as enterprise resource planning ("ERP") and customer relationship management ("CRM"), as well as consumer services, such as e-mail.

Distributed SOAs may provide many advantages over other application architectures, including service abstraction and dynamic configuration. Through service abstraction, the consumer of a service does not require any knowledge of how the service operates, which programming languages are used to implement the service, or on which operating system the service implementation executes. Instead, given the service interface, a user wanting to access the functionality implemented by the service just writes code to access the service through that interface and then handles the service output. Dynamic configuration allows for the binding of the consumer to a specific service instance, e.g. IP address, port, and access protocol, that actually provides the service, which can be dynamic and change from one execution to another. In addition, the structure of an application program in a distributed SOA may include programs that use one or more services in the architecture and those services may in turn utilize yet more services.

While the independent nature of the various services and features such as dynamic configuration provide some inherent advantages in the dependability of such SOAs, distributed SOAs also introduce many dependability and QoS challenges, including the difficulties associated with handling the partial failure of an executing program when a machine crashes, the need to deal with data consistency across machines in similar situations, the possibility of partitioned execution, and the like. An application executing on a distributed SOA may encounter faults in locating a service provider, including no service found, wrong service found, and timeout; faults in connecting with a service provider, including binding denied due to lack of authentication or authorization, binding to wrong service, and timeouts; as well as execution faults, such as service crash, incorrect results, and timeouts.

Because distributed SOAs often span multiple administrative domains, even within a single company, issues with trust between the different services may be introduced. In addition, software upgrades or other scheduled downtime in one administrative domain may interfere with applications spanning multiple domains, potentially resulting in unexpected application failures. Other QoS attributes such as timeliness and predictable application performance become challenging in a distributed SOA. Each service may execute on dedicated resources, but the workload of the service may depend on the cumulative workloads of all applications and other services that use this service. The workload of the service naturally dictates its response time. As a result, it may become increasingly difficult to predict the response time of an application since an unrelated application may suddenly start using, or increase its usage of, a shared service. The fact that new applications are introduced into the system may also increase the difficulty of predicting service workload.

Other QoS challenges result from the dependencies that can arise as a result of the invocation pattern within a SOA. As described above, in a distributed SOA, an application uses one or more services in the architecture, which in turn may use many other services. The services used may potentially be located all over the world, and be owned and operated by various organizations. As a result, the transitive closure of the services and organizations on which the application depends can become large and can in fact change over time due to dynamic binding. Similarly, the provider of a service will generally not know of all the applications and organizations that depend on its service. As a result, failures, maintenance actions, termination, or even updates of a service instance may have unanticipated consequences for multiple upstream and downstream services. Such extensive sets of dependencies also introduce security and trust challenges. Specifically, the information flow from one service to another is not visible to the application designer, who may know what is passed to or from a service, but not whether the service passes the information to other services potentially untrusted by the application designer.

Finally, the computing and networking infrastructure used may have an impact on QoS as well. For example, the emergence of cloud computing may introduce additional dependability challenges for SOAs when some of the services are executed on third-party cloud infrastructures. While cloud computing is often envisioned as a dynamic infrastructure that can automatically flex to accommodate changes in workloads and react to failures, it still introduces yet another entity that the end application will depend on both for uninterrupted operation and for assurance that data passed to and from the services remain private and uncorrupted.

SUMMARY

It should be appreciated that this Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable storage media for providing collaborative QoS for service-oriented architectures. According to aspects, the application services in the service-oriented architecture implement a QoS application-programming interface ("API") in addition to the traditional service API. The QoS API may include a QoS reporting interface for reporting values of QoS metrics of the application service, a QoS mechanism interface that exposes details of dependability mechanisms utilized by the application service, and/or a QoS negotiation interface that allows dynamic negotiation of what QoS properties the application service provides and how the QoS properties are provided. Service consumers may utilize the QoS API of the various application services in the service-oriented architecture to collect dependability information regarding the application services and make service provider selection decisions during discovery and dynamic binding.

Other systems, methods, and/or computer program products according to embodiments will be or become apparent to one skilled in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 4 is a block diagram showing an illustrative computer hardware and software architecture for a computing system capable of implementing aspects of the embodiments presented herein.

DETAILED DESCRIPTION

The following detailed description is directed to methods, systems, and computer-readable media for providing collaborative quality of service ("QoS") for service-oriented architectures ("SOAs"). Utilizing the technologies described herein, a collaborative QoS solution may be implemented in which services, service providers, and resource providers cooperate to implement dependability for the various services involved in a SOA. Specifically, translucent QoS interfaces are described that expose, in a controlled manner, the QoS guarantees and mechanisms of a service instance for use by other services, as well as provide an ability to negotiate QoS for service instances with customizable QoS. The concept may be further extended to multi-party collaboration to allow broader cooperation.

Figure 1:
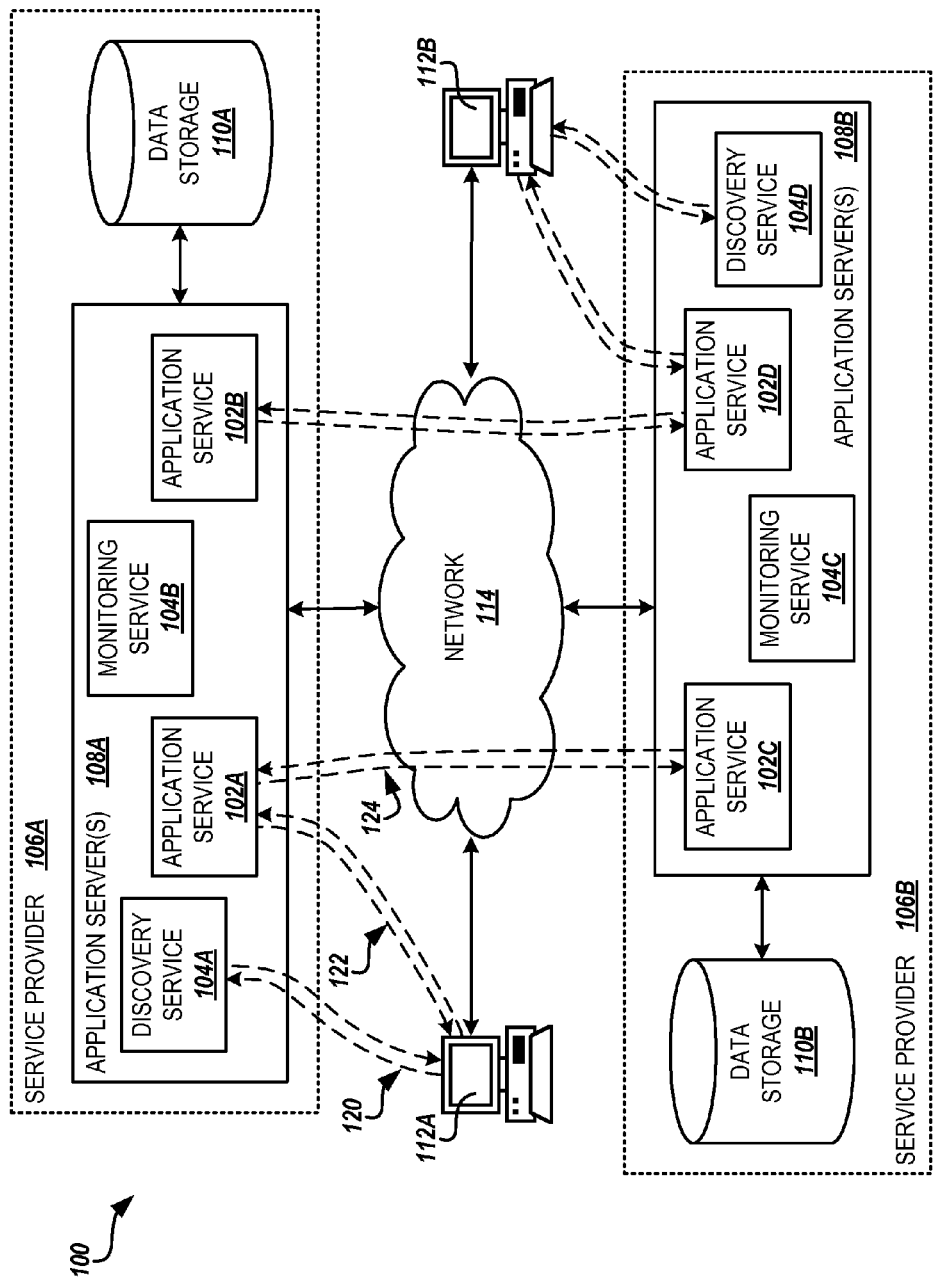
FIG. 1 is a block diagram illustrating an operating environment for a distributed service-oriented architecture in accordance with exemplary embodiments.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments. Referring now to FIG. 1, an illustrative operating environment 100 and several hardware and software components for providing collaborative QoS for service-oriented architectures are shown, according to embodiments.

As described above, a SOA includes a collection of interacting services, as illustrated in FIG. 1. The services may include both application services 102A-102D (referred to herein generally as application service 102) that implement application specific functionality as well as infrastructure services 104A-104D (referred to herein generally as infrastructure service 104), such as discovery services 104A, 104D, monitoring services 104B, 104C, authentication and authorization services, and the like. The infrastructure services 104 provide the foundation for building, running, and accessing the application services 102. As further described above, the various application services 102 and infrastructure services 104 in a distributed SOA may be provided by a number of separate, independent service providers 106A-106B (referred to herein generally as service provider 106), such as multiple geographically dispersed organizations and companies as well as sub-organizations in a single company.

Each service provider 106 may implement and operate one or more application servers 108A-108B (referred to herein generally as application servers 108) upon which the application services 102 and infrastructure services 104 may execute. It will be appreciated that the application servers 108 shown in FIG. 1 and described herein may represent conventional server computers, desktop PCs, network appliances, or any other computing devices known in the art. The services 102, 104 may be implemented on the application servers 108 in hardware, software, or any combination thereof. The service provider 106 may further implement other resources for support of the application services 102, infrastructure services 104, and other services and modules available in the SOA, such as data storage 110A-110B, networking resources, and the like.

A number of service consumers 112A-112B (referred to herein generally as service consumers 112) may operate in the environment 100 that interact with the application services 102 and infrastructure services 104 over a network 114. Service consumers 112 may include client computing devices, such as a desktop PC, a laptop, a hand-held computer, a personal digital assistants ("PDA"), a mobile device, a set-top box, a game console, and the like; independent computer systems external to the service providers 106, or other services or components in the SOA, as will be described below. The network 114 may include a LAN, a WAN, the Internet, or any other networking topology known in the art that connects the service consumers 112 to the application servers 108 hosting the various services 102, 104 of the SOA.

As indicated at 120 in FIG. 1, a particular service consumer, such as service consumer 112A, may contact a discovery service 104A at a particular service provider, such as the service provider 106A, to locate an application service, such as application service 102A, required by the consumer. The service provider 106A may publicize the available application services 102A, 102B by registering them with the discovery service 104A in the domain. The registration may include a description of the service provided, such as the methods and their argument types, and the address of the application server 108A. Utilizing the information obtained from the discovery service 104A, the service consumer 112 may connect with the application server 108A and construct one or more service requests for the application service 102A based on the method descriptions, referred to herein as service binding. It will be appreciated that the discovery and binding process may be completely dynamic and happen at runtime, or the binding process may be performed by an application designer at system design time.

The service consumer 112A may then execute the request(s) with the application service 102A, as further indicated at 122 in FIG. 1. According to embodiments, an application service 102 may call other application services 102, either in the same service provider 106A or in another service provider 106B in the distributed SOA, in order to complete the request from the service consumer 112A. For example, the application service 102A provided by service provider 106A may bind to application service 102C provided by service provider 106B and execute one or more requests to the service in order to fulfill requests from the service consumer 112A, as indicated at 124 in FIG. 1. The binding between the application service 102A and the application service 102C may be static, or the binding may be performed dynamically upon each request from the service consumer 112A.

It will be appreciated that the discovery and binding process and the service requests between service consumers 112 and application services 102, or between the various application services, may utilize any number of methods and protocols known in the art. For example, an SOA may comprise a number of Web services described using the Web Services Description Language ("WSDL"), with the messages exchanged between service consumers 112 and application services 102 transmitted using the Simple Object Access Protocol ("SOAP"). Other distributed architectures may be utilized for the SOA, including Java Remote Method Invocation ("RMI"), Common Object Request Broker Architecture ("CORBA"), and the like. It is intended that this application include all such methods and protocols.

As discussed above, the distributed nature and multiple administrative domains of the distributed SOA may introduce many dependability and QoS challenges, including performance and reliability issues, predictability of performance, trust issues, and data consistency and fault recovery across multiple services 102, 104 and service providers 106. Prior approaches for increasing the dependability of distributed SOA involved a combination of external monitoring of services and rebinding to alternative implementations should a failure occur. The service providers 106A, 106B may implement monitoring services 104B, 104C to monitor a subset of application services 102, diagnose faults and performance issues, and reconfigure to improve reliability and predictability of performance. For example, if the SOA uses an Enterprise Service Bus ("ESB") for communication between service consumers 112 and service providers, it is easy for the monitoring services to intercept messages and to measure the service times and other performance metrics of the monitored services. Monitoring functionality may be embedded in the service consumer 112, as well. For example, the timeout of a service request may trigger the service consumer 112 to locate a new service provider 106.

Such approaches, however, have numerous limitations, including:

Lack of Alternatives—Binding to an alternative implementation of a service may be of limited use in practice due to lack of identical services. Especially for internal enterprise services, there may simply not be other implementations that can be trusted. Furthermore, services are often used to provide controlled access to a data source. The data may be proprietary or sensitive to the extent that it is not feasible or advisable to replicate it to independent implementations or deployments of the service.

Application State Rollback—A service may maintain state on behalf of the service consumer's application. In such situations, rebinding to a different service instance may require a rollback in the application code to the point where the state was stored or created.

Monitoring Delay—External monitoring only provides historical information about the response time of a service instance. For example, the response time will often increase beyond its recent or historical averages when the instance becomes highly loaded, but the external monitor will not know about the increased workload until the impact is visible. Furthermore, external monitors have to be conservative in the amount of test traffic they submit to the service instance so as not to interfere with the serving of real requests and multiple measurements are always needed to average over sporadic noise. As a result, there is always a significant lag in the reporting of response time measurements. A delay is also present for status (availability) monitoring since a number of test messages may be required before a service can be declared failed. Having a message interception mechanism may alleviate some of the monitoring delay, but such mechanisms are typically not available in distributed SOAs.

Other Monitoring Limitations—External monitoring is fundamentally limited to information that can be extracted by sending and observing test requests or, if interception mechanism is available, observing real messages sent and received by services. Thus, it cannot report information only known by the service provider (e.g., next scheduled maintenance). Furthermore, it is typically impossible for external monitoring to address security related challenges.

Figure 2:
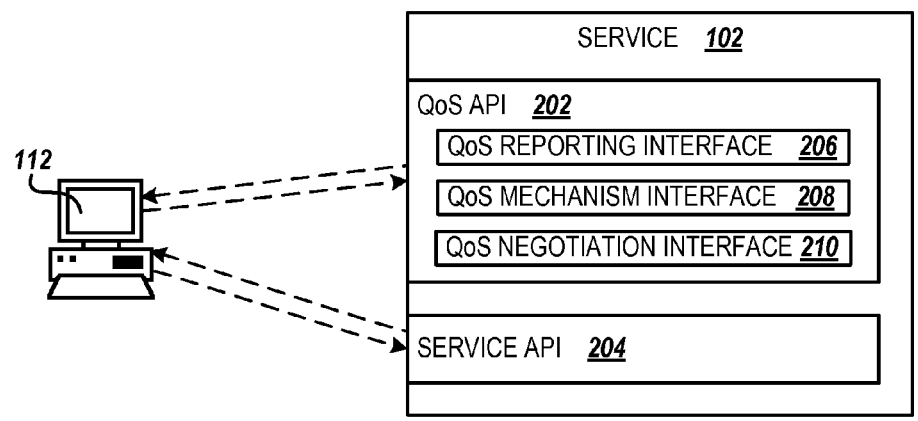
FIG. 2 is a block diagram providing details of a QoS API implemented by an application service for providing collaborative QoS in accordance with exemplary embodiments.

An alternative approach to monitoring involves the application services 102 in the distributed SOA collaborating with the service consumers 112 that utilize them and other services they utilize to ensure the overall desired level of dependability, according to embodiments. The collaboration may be implemented by means of a translucent QoS application-programming interface ("API") 202 that is exposed by the application services 102 to service consumers 112 in addition to their normal service API 204, as shown in FIG. 2. The QoS API 202 is translucent in the sense that it selectively exposes information related to the QoS and QoS mechanisms used by the service instance. According to embodiments, the QoS API 202 may expose three QoS interfaces: (1) a QoS reporting interface 206 that reports current QoS values, (2) a QoS mechanism interface 208 that exposes dependability and QoS mechanisms, and (3) a QoS negotiation interface 210 that can be used to negotiate QoS requirements.

The QoS reporting interface 206 of an application service 102 may report values for current, locally measured QoS metrics of the service. This information may be more valuable than that obtained from monitoring in that the service instance inherently has better information regarding its own state than any external monitoring service. For example, the service instance may measure the response time for each request it processes directly at relatively low cost. It may also predict its response time in the near future by observing its current workload and thereby provide information to service consumers 112 that can be used to decide whether the other services should bind to the reporting instance or some alternative. Similarly, the application service instance may know about the fault-tolerance techniques deployed to ensure its availability, the reliability of the underlying execution infrastructure, and any event, such as reduced redundancy due to failures, scheduled maintenance, and the like, that may reduce the expected availability at the current time. This and other information may be reported to service consumers 112 through the QoS reporting interface 206.

It will be appreciated that many specific metrics could be reported through the QoS reporting interface 206, including mean response time per call or per operation type and variance, maximum overall response time, expected availability, maximum and/or average throughput, security status or attributes, time and duration of next known downtime (e.g. for scheduled maintenance), and the like. Table 1 below provides a snippet of a WSDL specification for the QoS reporting interface 206, according to one embodiment. In this embodiment, the QoS API 202 provides an interface for querying individual attribute values one at a time by specifying the name of the attribute. The basic set of attribute names may be standardized or discoverable through an additional request.

TABLE 1

Example QoS Reporting Interface Specification

```
<message name="QoSRequest">
    <part name="AttributeName" type="xsd:string"/>
</message>
<message name="QoSResponse">
    <part name="AttributeValue" type="xsd:float"/>
</message>
<portType name="QoSQuery">
    <operation name="askValue">
        <input message="tns:QoSRequest"/>
        <output message="tns:QoSResponse"/>
    </operation>
</portType>
```

As an example, a service consumer 112 may utilize the QoS reporting interface 206 to determine the next scheduled downtime of an application service 102 for system maintenance. System maintenance actions that bring the system down for a period of time may be relatively frequent (e.g., many smaller banks do weekly system maintenance) and their duration may be unpredictably long due to failed software upgrades. In a traditional SOA, there may be no way for the service provider 106 to communicate to service consumers 112 the upcoming maintenance actions. Similarly, any external monitoring service can only detect the outage caused by the maintenance action when the system goes down.

Having the QoS API 202 attached to the application service 102, as described in the embodiments herein, makes it trivial to report to any potential service consumers 112 when the service will be going down, and potentially when it is anticipated to be restored and available for service again. As a result, service consumers 112, knowing how long they require the application service 102 to complete their task, can determine if they can use the service provider 106 or if they should look for another provider of the same or similar service. It will be appreciated that self-reporting in an untrusted environment may be prone to abuse. Therefore, in an untrusted environment, additional external monitoring services may be implemented to provide a point of comparison and thereby allow service consumers 112 to determine which application services 102 and service providers 106 to use with greater confidence.

The QoS mechanism interface 208 of an application service 102 exposes the details of the dependability mechanisms utilized by the service, according to another embodiment. For example, an application service instance may expose through the QoS mechanism interface 208 the identity of a backup service with known compatibility, i.e., with both the same syntax and semantics of operations, as well as the same underlying data if the services relies on a data source. For service implementations that use a form of internal replication, the QoS mechanism interface 208 may expose the current level of redundancy in the service implementation, e.g. the current number of operational replicas, and/or the expected recovery time in case of a failure. Specifically, if a replica of the application service 102 fails, it may take a period of time for the service to recover given the time to detect and then reconfigure the service. This information can be provided through QoS mechanism interface 208 to help a service consumer 112 using the application service 102 to decide if it should look for an alternative implementation, use the service in degraded mode, or wait for full recovery. The QoS mechanisms exposed by the QoS mechanism interface 208 may also include security mechanisms, such as the type and strength of data encryption utilized for data stored on disk, encryption of data in downstream service requests, and the like.

In a further embodiment, a collaborative checkpointing QoS mechanism is exposed through the QoS mechanism interface 208. Typically, any checkpointing of an application service state is done within the implementation without exposing the details to any of the service consumers 112. In collaborative checkpointing, the service provider exposes the checkpoint of the consumer's session state to the service consumer 112 to be stored and used later if necessary. Tables 2 and 3 provide snippets of WSDL for example interfaces supporting collaborative checkpointing. According to the embodiment, the response messages in the service API 204 for service requests that modify the session state are enhanced to include a checkpoint of the service session state, as shown in Table 2.

TABLE 2

Extension to Service API Specification
for Collaborative Checkpointing

```
<message= ...response message to update operation ... >
    ... original response arguments ...
    <part name="CheckpointValue" type="xsd:any"/>
</message>
```

Further, two additional operations may be provided for the service consumer 112 through the QoS mechanism interface 208 to restore the service provider 106 with the stored checkpoint, as shown in Table 3.

TABLE 3

Example QoS Mechanism Interface
for Collaborative Checkpointing

```
<message name="RestoreMessage">
    <part name="CheckpointValue" type="xsd:any"/>
</message>
<message name="RestoreResponse">
    <part name="RestoreSuccess" type="xsd:boolean"/>
</message>
<portType name="CheckpointPort">
    <operation name="restoreCheckpoint">
        <input message="tns:RestoreMessage"/>
        <output message="tns:RestoreResponse"/>
    </operation>
</portType>
```

While exposing dependability information through the QoS reporting interface 206 and QoS mechanism interface 208 allows service consumers 112 to make a better choice among alternative service providers 106, the QoS negotiation interface 210 allows the consumer and provider to reach an agreement dynamically on what QoS properties are provided and how the QoS properties are provided. The QoS negotiation interface 210 may provide interfaces allowing a service consumer 112 to take advantage of any service customization features provided by the service provider 106. For example, a service provider 106 may have multiple fault-tolerance techniques from which to choose for the provided application services 102, each of which provides a given level of dependability but with its own cost in terms of increased response time or increased resource usage. Similar tradeoffs may be present for security mechanisms, e.g., cost of cryptographic techniques for data privacy and integrity, and timeliness properties, e.g., cost of reserving dedicated resources to satisfy customer's response time requirements.

The QoS negotiation interface 210 may be implemented using simple XML specification, or it may be implemented using standard protocols, such as the Web Services Agreement Specification ("WS-Agreement") from the Open Grid Forum. Table 4 illustrates a simple QoS negotiation interface 210, according to one embodiment, where the service consumer 112 presents the required QoS values and the application service 102 either agrees to provide them or indicates it is not able to comply. In a further embodiment, a more complex QoS negotiation interface 210 may allow the application service 102 to present a counter proposal that the service consumer 112 could accept or reject. The penalty and reward for meeting or missing the agreed QoS level established through the QoS negotiation interface 210 may also be part of the negotiation.

As an example, a real-time application may be required to react to an event within a specified time window. The designer of the real-time application may be able to determine how much time local code execution takes, but if the application uses external application services 102 in a SOA, the response time of the application services may be unknown. A service consumer 112 in the real-time application may utilize the QoS negotiation interface 210 to locate application services 102 provided by service providers 106 that can complete the service requests in the required time. Upon receiving such a negotiation request, a service provider 106 can attempt to reserve the resources necessary to meet the timeliness requirements requested from the application services 102 through the QoS negotiation interface 210.

TABLE 4

Example QoS Negotiation Interface Specification

```
<message name="QoSNegotiationRequest">
    <part name="AverageResponseTime" type="xsd:Float"/>
    <part name="Availability" type="xsd:Float"/>
    <part name="Reliability" type="xsd:Float"/>
    ...
</message>
<message name="QoSNegotiationResponse">
    <part name="QoSResponse" type="xsd:boolean"/>
</message>
<portType name="QoSNegotiation">
    <operation name="Negotiate">
        <input message="tns:QoSNegotiationRequest"/>
        <output message="tns:QoSNegotiationResponse"/>
    </operation>
</portType>
```

It will be appreciated that QoS collaboration between a service consumer 112 and the application services 102 of a service provider 106 may be challenging if the service provider 106 chooses to misrepresent its QoS metrics or mechanisms. Similarly, implementation of the QoS API 202 may not overcome the trust issues that arise in a distributed SOA described above because the service consumer 112 may not be able to justifiably rely on any security information reported by the application services 102 of an unknown service provider 106. The application designer may use knowledge about the service providers 106 in the SOA obtained off-line to determine which application services 102 the application should use, but unless a list of trusted service providers can be encoded in the service consumer application program, it is difficult to use such off-line trust evaluation for dynamic runtime service binding in an application.

Figure 3:
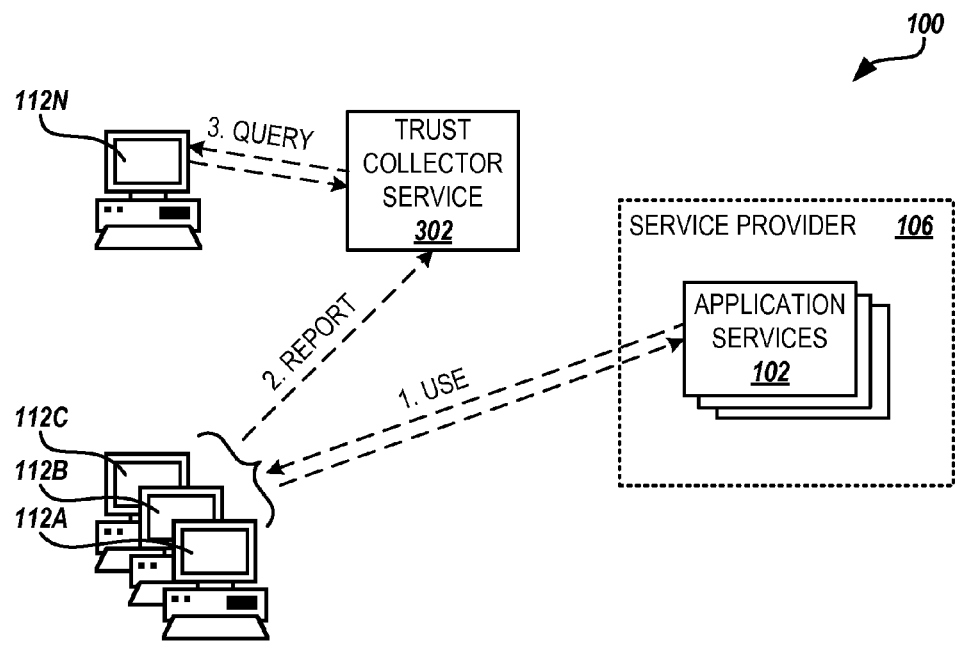
FIG. 3 is a block diagram providing details of a trust collector service implemented in a service-oriented architecture environment, in accordance with exemplary embodiments.

One solution to this issue is to extend the concept of collaborative QoS from the collaboration between one service consumer 112 and the application services 102 of one service provider 106 to a collaboration between all or a large number of service consumers 112. According to one embodiment, a trust collector service 302 is implemented in the environment 100, as illustrated in FIG. 3. The trust collector service 302 may be a hardware or software module implemented by one or more service providers 106 or a third party. The trust collector service 302 may be used by multiple service consumers, such as the service consumers 112A-112C, to report information regarding any positive or negative service experiences with the application services 102 provided by a service provider 106.

The service consumers 112A-112C may utilize performance measures and negotiated QoS mechanisms/metrics collected during service requests to a provider's application services 102 to determine a level of service provided by the service provider 106. The service consumers 112A-112C may then report the determined service level to the trust collector service 302 over the network 114, as further illustrated in FIG. 3. The collaboration pattern may be analogous to online rating systems such as seller ratings at an online auction website, but in a machine-readable form utilizing a standard rating system for reporting service quality. After a period of time of operation of the application services 102, the trustworthiness of a service provider 106 may become apparent from the accumulated report information collected from the service consumers 112A-112C by the trust collector service 302. A new service consumer 112N may then query the trust collector service 302 to determine the trustworthiness of a service provider 106 providing specific application services 102 in the distributed SOA, and combine this information with other information during service discovery and binding to select the service providers 106 and/or application services 102 to utilize.

FIG. 4 is a block diagram illustrating a computer system 400 capable of executing the software components described herein for providing collaborative QoS for service-oriented architectures, in accordance with exemplary embodiments. The computer system 400 may be representative of the application servers 108 described above in regard to FIG. 1. In addition, the computer system 400 may be utilized to implement the application services 102, the infrastructure services 104, and the trust collector service 302, each of which was described above in regard to FIGS. 1 and 3. The computer system 400 may include one or more processing units 402, a memory 404, one or more user interface devices 406, one or more input/output ("I/O") devices 408, and one or more network interface controllers 410, each of which is operatively connected to a system bus 412. The bus 412 enables bi-directional communication between the processing units 402, the memory 404, the user interface devices 406, the I/O devices 408, and the network interface controllers 410.

The processing units 402 may be standard central processors that perform arithmetic and logical operations, more specific purpose programmable logic controllers ("PLCs"), programmable gate arrays, or other type of processor known to those skilled in the art and suitable for controlling the operation of the computer. The processing units 402 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include WINDOWS® and WINDOWS SERVER® operating systems from Microsoft Corporation, UNIX® from The Open Group of San Francisco, Calif., LINUX, and the like.

Examples of the program module 418 include application services 102 and infrastructure services as well as the trust collector service 302, each of which was described above in regard to FIGS. 1 and 3. In one embodiment, the program modules 418 are embodied in computer-readable storage media containing instructions that, when executed by the processing unit 402, perform methods or routines for providing collaborative QoS for service-oriented architectures, as described in greater detail above. According to further embodiments, the program modules 418 may be embodied in hardware, software, firmware, or any combination thereof.

By way of example, and not limitation, computer-readable storage media comprise volatile and non-volatile, removable and non-removable media implemented in any method or technology for the non-transitory storage of information such as computer-readable instructions, data structures, program modules, or other data. Computer-readable storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information in a non-transitory fashion and which can be accessed by the computer system 400.

The user interface devices 406 may include one or more devices with which a user accesses the computer system 400. The user interface devices 406 may also include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a speaker, a display screen, or a printer.

The network interface controllers 410 enable the computer system 400 to communicate with other networks or remote systems via a network 414, such as the network 114 described above in regard to FIG. 1. Examples of the network interface controllers 410 may include, but are not limited to, a modem, a radio frequency ("RF") or infrared ("IR") transceiver, a telephonic interface, a bridge, a router, or a network card. The network 414 may include a wireless network such as, but not limited to, a wireless local area network ("WLAN") such as a Wi-Fi network, a wireless wide area network ("WWAN"), a wireless personal area network ("WPAN") such as BLUETOOTH, a wireless metropolitan area network ("WMAN") such as a WiMAX network, or a cellular network. Alternatively, the network 414 may be a wired network such as, but not limited to, a WAN such as the Internet, a LAN such as an Ethernet network, a wired personal area network ("PAN"), or a wired metropolitan area network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing collaborative quality-of-service for a service-oriented architecture, the method comprising:
    exposing, by an application service executing on an application server, a service application-programming interface to a service consumer;
    exposing, by the application service executing on the application server, a quality-of-service application-programming interface to the service consumer, the quality-of-service application-programming interface reporting quality-of-service metrics of the application service, the quality-of-service metrics measured by the application service;
    receiving, by the application service through the quality-of-service application-programming interface from the service consumer, a request for a quality-of-service metric of the quality-of-service metrics of the application service, the request received during dynamic binding between the service consumer and the application service; and
    responding to the request by providing, by the application service via the quality-of-service application-programming interface, the quality-of-service metric to the service consumer.

2. The method of claim 1, wherein the quality-of-service application-programming interface comprises a quality-of-service reporting interface configured to report the quality-of-service metrics of the application service.

3. The method of claim 1, wherein the quality-of-service metric comprises a scheduled downtime of the application service.

4. The method of claim 1, wherein the quality-of-service application-programming interface comprises a quality-of-service mechanism interface configured to expose details of dependability mechanisms utilized by the application service.

5. The method of claim 1, wherein the quality-of-service application-programming interface comprises a quality-of-service negotiation interface configured to allow the service consumer and the application service to reach an agreement dynamically on what quality-of-service properties are provided and how the quality-of-service properties are provided.

6. The method of claim 1, further comprising exposing a collaborative checkpointing mechanism through the quality-of-service application-programming interface and the service application-programming interface, wherein a session state of the application service corresponding to the service consumer is provided to the service consumer through the service application-programming interface.

7. The method of claim 1, further comprising implementing a trust collector service configured to collect reported information from the service consumer regarding a service experience with the application service and to provide query services to other service consumers for the reported information.

8. An application server for providing collaborative quality of service for service-oriented architectures, the application server comprising:
   a processor; and
   a memory storing an application service embodied in instructions that, when executed by the processor, cause the processor to perform operations comprising
      exposing, to a service consumer, a service application-programming interface,
      exposing, to the service consumer, a quality-of-service application-programming interface that reports quality-of-service metrics of the application service, the quality-of-service metrics measured by the application service,
      receiving, through the quality-of-service application-programming interface from the service consumer, a request for a quality-of-service metric of the quality-of-service metrics of the application service, the request received during dynamic binding between the service consumer and the application service, and
      responding to the request by providing, via the quality-of-service application-programming interface, the quality-of-service metric to the service consumer.

9. The application server of claim 8, wherein the quality-of-service application-programming interface comprises a quality-of-service reporting interface configured to report the quality-of-service metrics of the application service.

10. The application server of claim 8, wherein the quality-of-service metric comprises a scheduled downtime of the application service.

11. The application server of claim 8, wherein the quality-of-service application-programming interface comprises a quality-of-service mechanism interface configured to exposes details of dependability mechanisms utilized by the application service.

12. The application server of claim 8, wherein the quality-of-service application-programming interface comprises a quality-of-service negotiation interface configured to allow the service consumer and the application service to reach an agreement dynamically on what quality-of-service properties are provided and how the quality-of-service properties are provided.

13. The application server of claim 8, wherein the quality-of-service application-programming interface and the service application-programming interface are configured to expose a collaborative checkpointing mechanism, wherein a session state of the application service corresponding to the service consumer is provided to the service consumer through the service application-programming interface.

14. The application server of claim 8, wherein the memory further stores a trust collector service embodied in additional instructions that, when executed by the processor, cause the processor to perform further operations comprising:
   collecting, from the service consumer, reported information regarding a service experience with the application service; and
   providing, to other service consumers, query services for the reported information.

15. A non-transitory computer-readable storage medium storing an application service embodied in instructions that, when executed by an application server, cause the application server to perform operations comprising:
   exposing, to a service consumer, a service application-programming interface;
   exposing, to the service consumer, a quality-of-service application-programming interface that reports quality-of-service metrics of the application service, the quality-of-service metrics measured by the application service;
   receiving, through the quality-of-service application-programming interface from the service consumer, a request for a quality-of-service metric of the quality-of-service metrics of the application service, the request received during dynamic binding between the service consumer and the application service; and
   responding to the request by providing, via the quality-of-service application-programming interface, the quality-of-service metric to the service consumer.

16. The non-transitory computer-readable storage medium of claim 15, wherein the quality-of-service application-programming interface comprises a quality-of-service reporting interface configured to report the quality-of-service metrics of the application service.

17. The non-transitory computer-readable storage medium of claim 15, wherein the quality-of-service application-programming interface comprises a quality-of-service mechanism interface configured to exposes details of dependability mechanisms utilized by the application service.

18. The non-transitory computer-readable storage medium of claim 15, wherein the quality-of-service application-programming interface comprises a quality-of-service negotiation interface configured to allow the service consumer and the application service to reach an agreement dynamically on what quality-of-service properties are provided and how the quality-of-service properties are provided.

19. The non-transitory computer-readable storage medium of claim 15, wherein the quality-of-service application-programming interface and the service application-programming interface are configured to expose a collaborative checkpointing mechanism, wherein a session state of the application service corresponding to the service consumer is provided to the service consumer through the service application-programming interface.

20. The non-transitory computer-readable storage medium of claim 15, storing a trust collector service embodied in additional instructions that, when executed by the application server, cause the application server to perform further operations comprising:
   collecting, from the service consumer, reported information regarding a service experience with the application service; and
   providing, to other service consumers, query services for the reported information.

* * * * *